United States Patent [19]

Roslonski

[11] Patent Number: 5,661,030

[45] Date of Patent: Aug. 26, 1997

[54] METHOD AND APPARATUS FOR DIGESTING WASTE

[76] Inventor: Donald J. Roslonski, 38 Fairview Ave., Brick Town, N.J. 08723

[21] Appl. No.: 338,644

[22] Filed: Nov. 14, 1994

[51] Int. Cl.⁶ .................................................. C12M 3/00
[52] U.S. Cl. ...................... 435/290.2; 435/286.7; 435/290.4
[58] Field of Search .................... 435/290.1, 290.2, 435/290.4, 286.7

[56] References Cited

U.S. PATENT DOCUMENTS 3,114,622  12/1963  Hardy ................................. 435/290.2
5,149,196   9/1992  Piacentino et al. ..................... 366/345

Primary Examiner—David A. Redding
Attorney, Agent, or Firm—Clifford G. Frayne

[57] ABSTRACT

A waste digester composter for organic waste in which the organic waste is introduced into a housing member proximate its outer circumference and subjected to vertical agitation and horizontal agitation through a plurality of depending chain drives, the treated organic waste exiting the housing proximate to its center, the treated organic waste now having a character suitable for use as a fertilizer or a soil enhancer to replace humus in depleted soil.

12 Claims, 6 Drawing Sheets

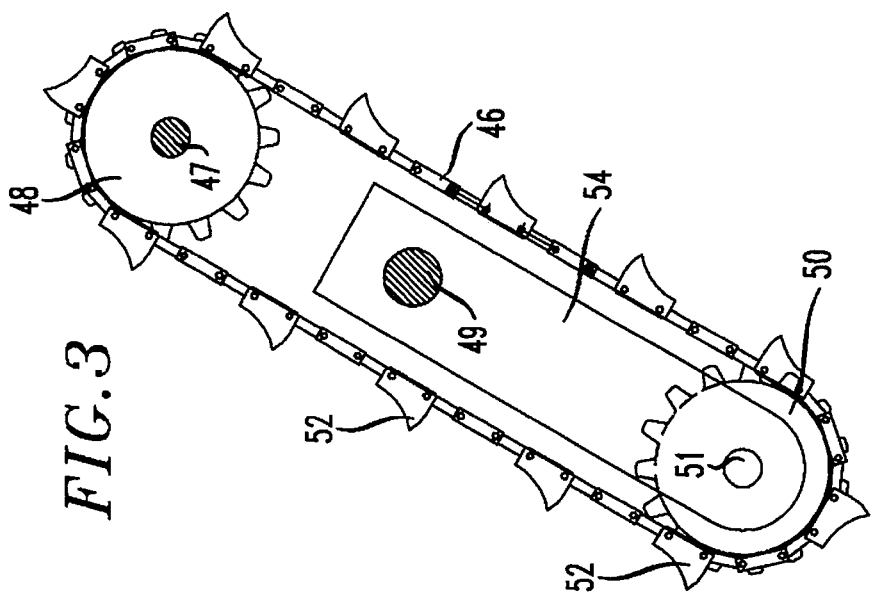
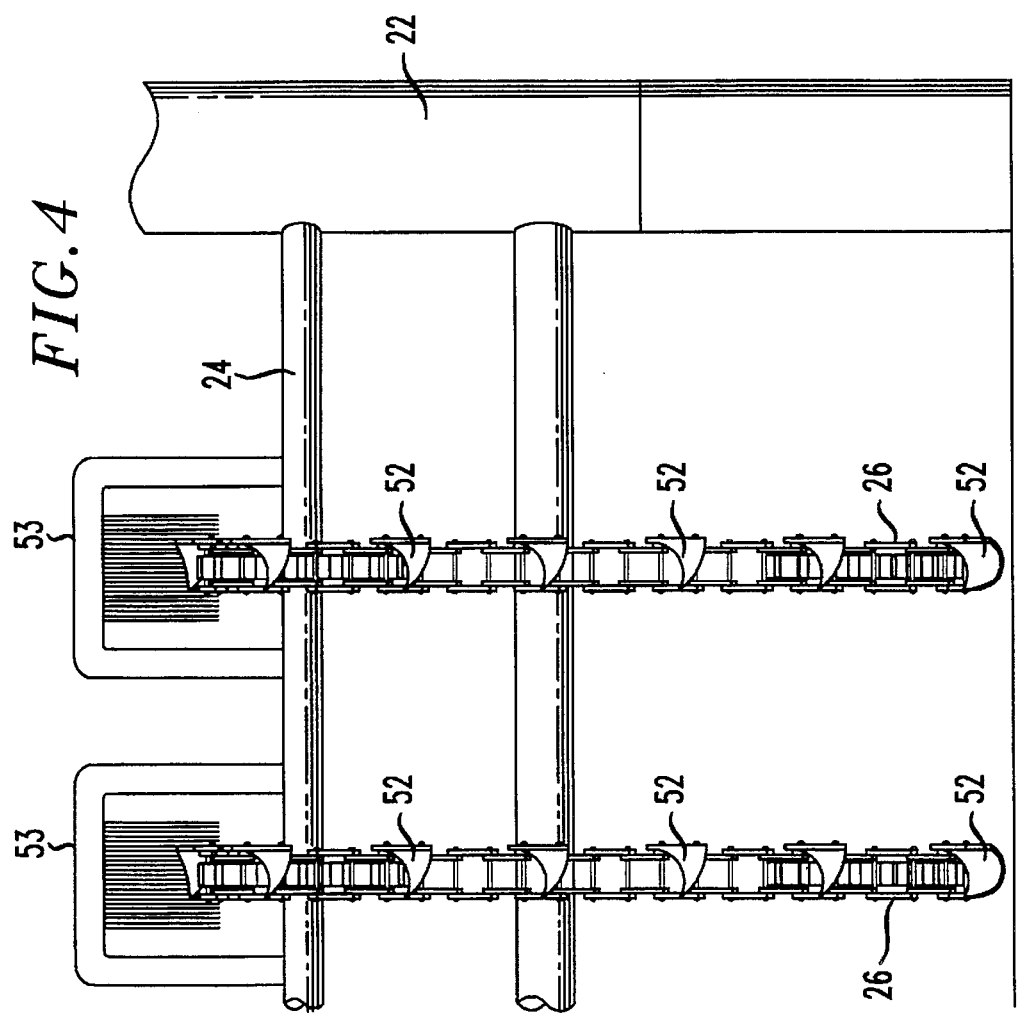

FIG.5
FIG.6
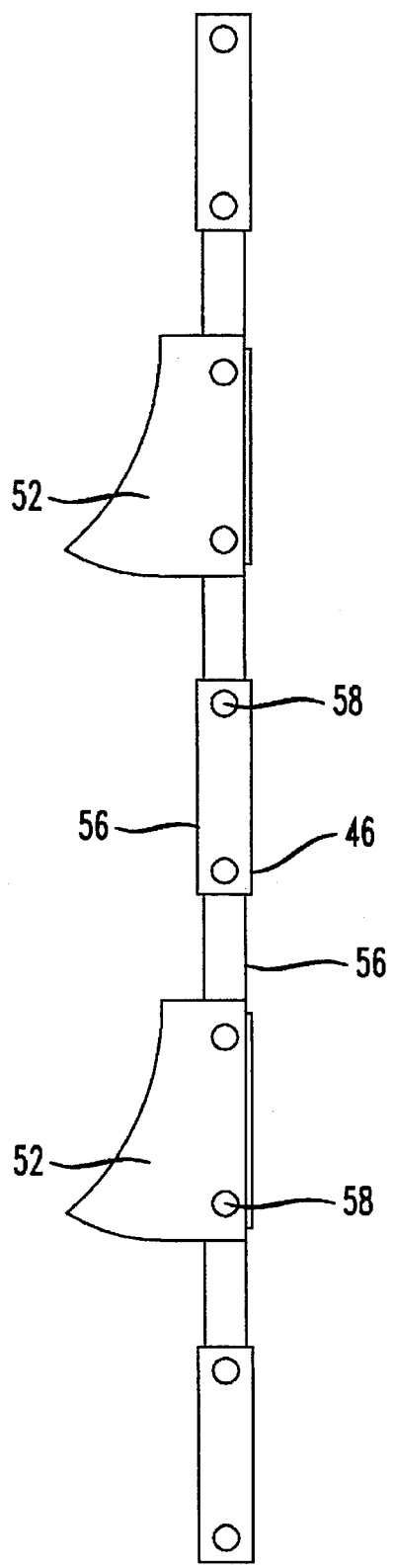
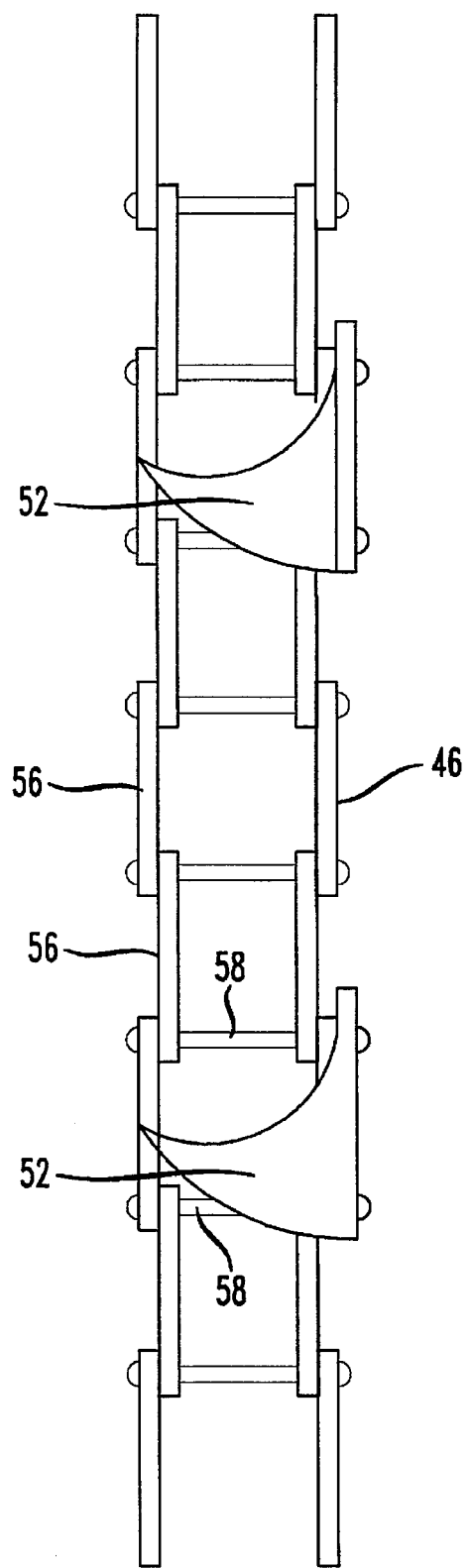

METHOD AND APPARATUS FOR DIGESTING WASTE

BACKGROUND OF THE INVENTION

1. Field of the Invention

The invention is directed to a method and apparatus for treating organic waste material, such as garbage and converting the organic waste material for other purposes, such as fertilizer or a soil enhancer to replace humus in depleted soil.

2. Description of the Prior Art

The most common procedure for dealing with organic waste material, such as garbage, is to empty the garbage into a landfill area in successive layers, with each layer being covered with a layer of topsoil or dirt. Eventually, the area in the landfill for the receipt of garbage becomes exhausted and a cap of soil is placed over the landfill.

More recently, experiments have taken place with cogeneration plants in which the garbage is burned in an enclosed receptacle, the theory and idea being that the burning of the garbage will generate sufficient heat to generate steam for other uses.

The Applicant has developed a method and apparatus for transforming the organic waste material in the form of garbage into a soil enhancer as fertilizer. Applicant's invention relies upon the use of naturally generated bacteria which convert the organic waste material into the soil enhancer or fertilizer.

Composters have been utilized by individuals for many years to convert organic waste material into fertilizer or fill through the use of bacteria, but the shortcomings with most composters are that they are a batch system which does not present the optimum amount of air and the optimum temperature for completing the process in an expeditious amount of time.

Applicant's invention is based upon the theory of composters, but Applicant has designed the apparatus to work in a continuous or intermittent process as desired, but having the capability to agitate the organic waste matter and control the temperature within the organic waste matter in order to obtain optimum operating environment conditions and the desired cyclic rate.

The prior art, and in particular, U.S. Pat. No. 3,114,622 discloses a continuous or intermittent digester utilizing substantially vertically depending augers or screws to agitate the organic waste matter within a container. The shortcoming with respect to this system is that the augers or screws have a tendency to gather or accumulate the organic waste material about the axis of the auger or screw, thus defeating its purpose in fully agitating the organic waste matter. Applicant has improved upon this design with an agitation means which will cause the positive dislocation and hence agitation of the organic waste material; redistribute the organic waste material continuously from the lower portion of the housing to the upper portion of the housing; and, simultaneously urge the organic waste material from the outer circumference of the housing where the untreated organic waste material is introduced, towards the center of the housing where the fully decomposed organic waste material, now in the form of clean fill or fertilizer, is discharged. Applicant's agitation means further aides in the propulsion of the agitation means carriage in a circular motion within the housing to ensure the full and optimum agitation of the organic waste material contained therein.

OBJECTS OF THE INVENTION

An object of the present invention is to provide for a novel method and apparatus for converting organic waste material to fertilizer or a soil enhancer to replace humus in depleted soil.

A further object of the present invention is to provide a novel method and apparatus which can operate in a continuous or intermittent mode for the conversion of organic waste material to fertilizer or a soil enhancer to replace humus in depleted soil.

A still further object of the present invention is to provide for a novel method and apparatus for the continuous agitation of organic waste material in order to maintain the optimum temperature and residence time for the growth of bacteria in all directions for the conversion of the organic waste material to fertilizer or a soil enhancer to replace humus in depleted soil.

A still further object of the present invention is to provide a novel method and apparatus which agitates the organic waste material.

A still further object of the present invention is to provide for a novel method and apparatus for the conversion of organic waste material to fertilizer and clean landfill wherein the agitation means is self-cleaning so as to enhance the agitation process.

A still further object of the present invention is to provide for a novel method and apparatus for the treatment of organic waste material which permits the apparatus to automatically control and maintain the optimum agitation, the residence time of the organic waste material within the treatment vessel, and the temperature and moisture within the treatment vessel.

A still further object of the present invention is to provide for a novel method and apparatus for the treatment of organic waste material which is environmentally safe and produces no offensive odors.

SUMMARY OF THE INVENTION

A waste digester or composter for biodegradable organic waste in which the biodegradable organic waste is introduced into a housing member proximate to its outer circumference, the biodegradable organic waste being subjected to agitation by means of a plurality of depending continuous chain drives or belts having teeth thereon, the plurality of continuous chain drives or belts depending from a support carriage arm which rotates about the inner portion of the housing member agitating the biodegradable organic waste from the lower portion of the housing member to the upper surface while simultaneously urging the biodegradable waste towards the center of the housing member where a discharge means is located, the agitation and residence time of the biodegradable organic waste is controlled so as to ensure that the discharge consists of completely decomposed organic fertilizer or a soil enhancer to replace humus in depleted soil having no noxious or undesirable odor.

BRIEF DESCRIPTION OF THE DRAWINGS

These and other objects of the present invention will become apparent, particularly when taken in light of the following drawings and specification wherein:

FIG. 3 is a side view of the agitation means;

FIG. 4 is a front view of the agitation means;

FIG. 5 is a partial side view of the agitation means;

FIG. 6 is a partial top view of the agitation means;

DETAILED DESCRIPTION OF THE DRAWINGS

Figure 1:
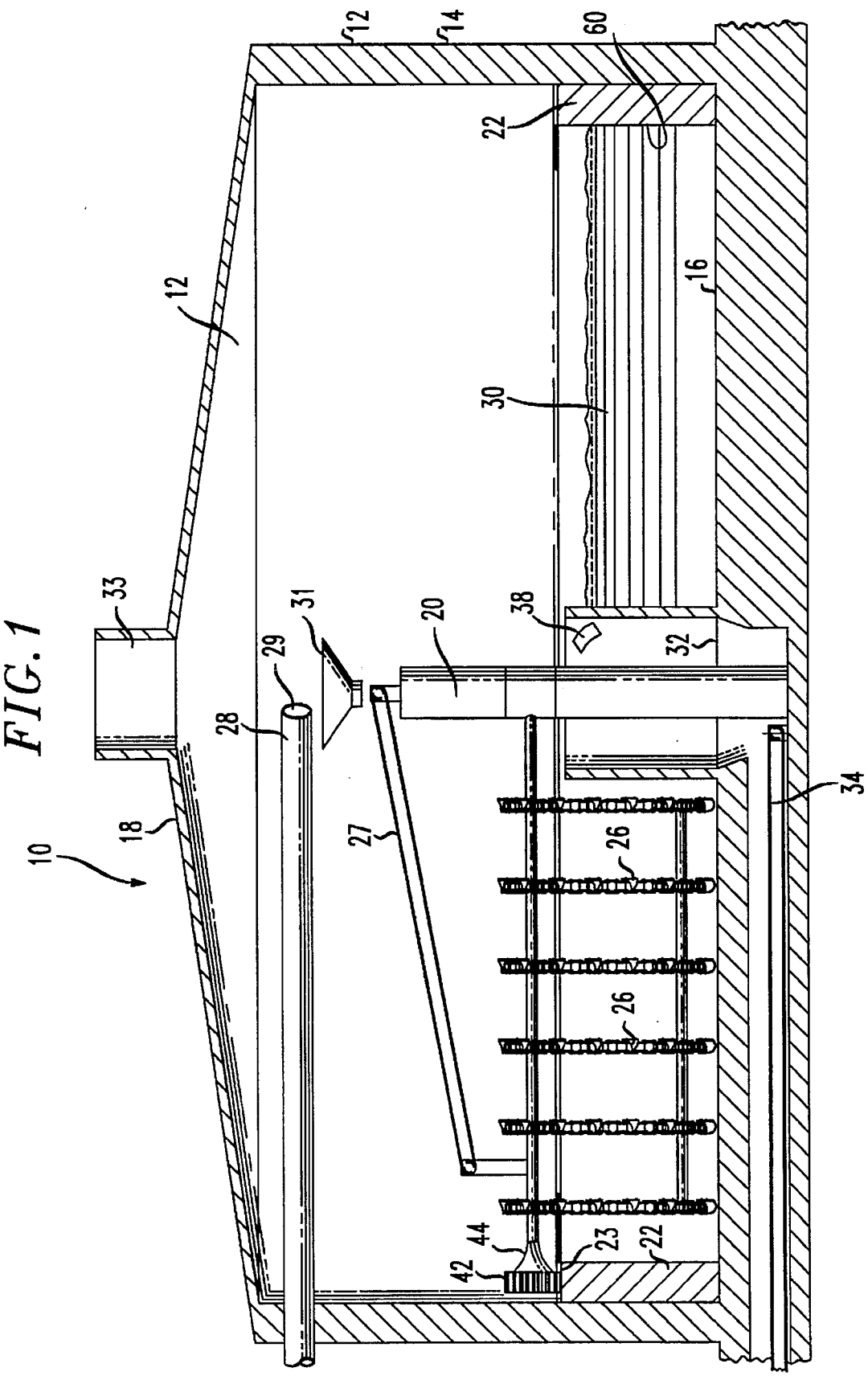
FIG. 1 is a cross-sectional side view of the waste digester.

FIG. 1 illustrates a cross-sectional view of the waste digester or composter 10. Waste digester 10 comprises an enclosed housing 12 which, in a preferred embodiment, has a cylindrical sidewall 14, a base or bottom 16 and a roof 18.

Within housing 12, there is centrally positioned a support pillar 20 and about the inner circumference of housing 12, there is a support shoulder 22. Suspended between support pillar 20 and support shoulder 22 is a support carriage 24 on which there is mounted a plurality of depending agitation means 26 as will be discussed hereafter.

An inlet means 28 is positioned in housing 12 for the introduction of organic waste material 30 into the housing. Inlet means 28 extends into housing 12 a distance sufficient to introduce and deposit untreated organic waste matter proximate to the outer circumference of housing 12, such outer circumference as defined by inwardly-depending support shoulder 22.

In the preferred embodiment as illustrated in FIG. 1, inlet means 28 would extend into housing 12 a sufficient distance to permit the inlet opening 29 to be positioned above a hopper 31 on support pillar 20. Support pillar 20 and support carriage 24 would support a distribution means 27 in the form of a continuous belt or augered passageway which would redirect the organic waste material towards the outer circumference of housing 12 and deposited proximate to inwardly-depending support shoulder 22. This manner of introduction allows for the distribution of the organic waste material in an even manner about the outer circumference of housing 12 since the distribution means 27 by being mounted on support pillar 20 and support carriage 24 will rotate with support carriage 24, as explained hereafter, thus providing for the even distribution of the organic waste material about the circumference.

The inlet means 28 for the introduction of untreated organic waste matter could be in the form of an auger or screw or a conveyor means which would be suitable for transporting the untreated organic waste matter into digester 10 and depositing it in hopper 31.

Centrally deposed about support pillar 20, in the base or floor 16 of digester 10, is an outlet means 32. Outlet means 32 comprises a concentric opening about support pillar 20 and is in communication with a transport means 34 to transport the treated organic waste material, now in the form of fertilizer or clean fill to a storage means or a vehicular transport means. Again in the instant example, this transport means 34 could be in the form of an auger or screw or a conveyor means for the transport of the treated organic waste material. Extending upwardly from the circumference of outlet means 32, a height sufficient to be above the level of the organic waste material deposited in digester 10, is a barrier wall 36 which has a vertical slit opening 38 formed to face in the opposite direction of the rotation of the support carriage 24 and formed by the decreasing circumferential radius of barrier wall 36 so as to present vertical slit 38 as a passageway for treated organic waste material to fall under the operation of gravity into outlet means 32.

Support carriage 24 would rotate about support pillar 20 while suspended between support pillar 20 and support shoulder 22. Preferably, the upper surface 23 of support shoulder 22 would have a continuous, sequential plurality of indents 40 for receipt of gear teeth 42 and such gear teeth 42 would be positioned about a cogwheel 44 secured to support carriage 24. This ensures the positive rotation of support carriage 24 about support pillar 20.

The means for powering the rotation of support carriage 24 may vary. Support pillar 20 or the upper portion thereof may be rotationally driven by a motor 43, thus causing the circular rotation of support carriage 24; cog gear wheel 44 may be rotationally driven by a motor 45 causing cogwheel 44 through the cooperation of gear teeth 42 and indents 40 to rotate on support shoulder 22 about the inner circumference of housing 12 or support pillar 20 and cog gear wheel 44 may both be simultaneously driven to effectuate the rotation. Distribution means 27, be it a continuous belt or an augured pipe, would similarly have several options with respect to the means by which it would be powered to transport the introduced organic waste material 30 to the outer circumference. Roof 18 would have positioned thereon a suitable air pollution control device 33 such as a scrubber or filter.

Figure 2:
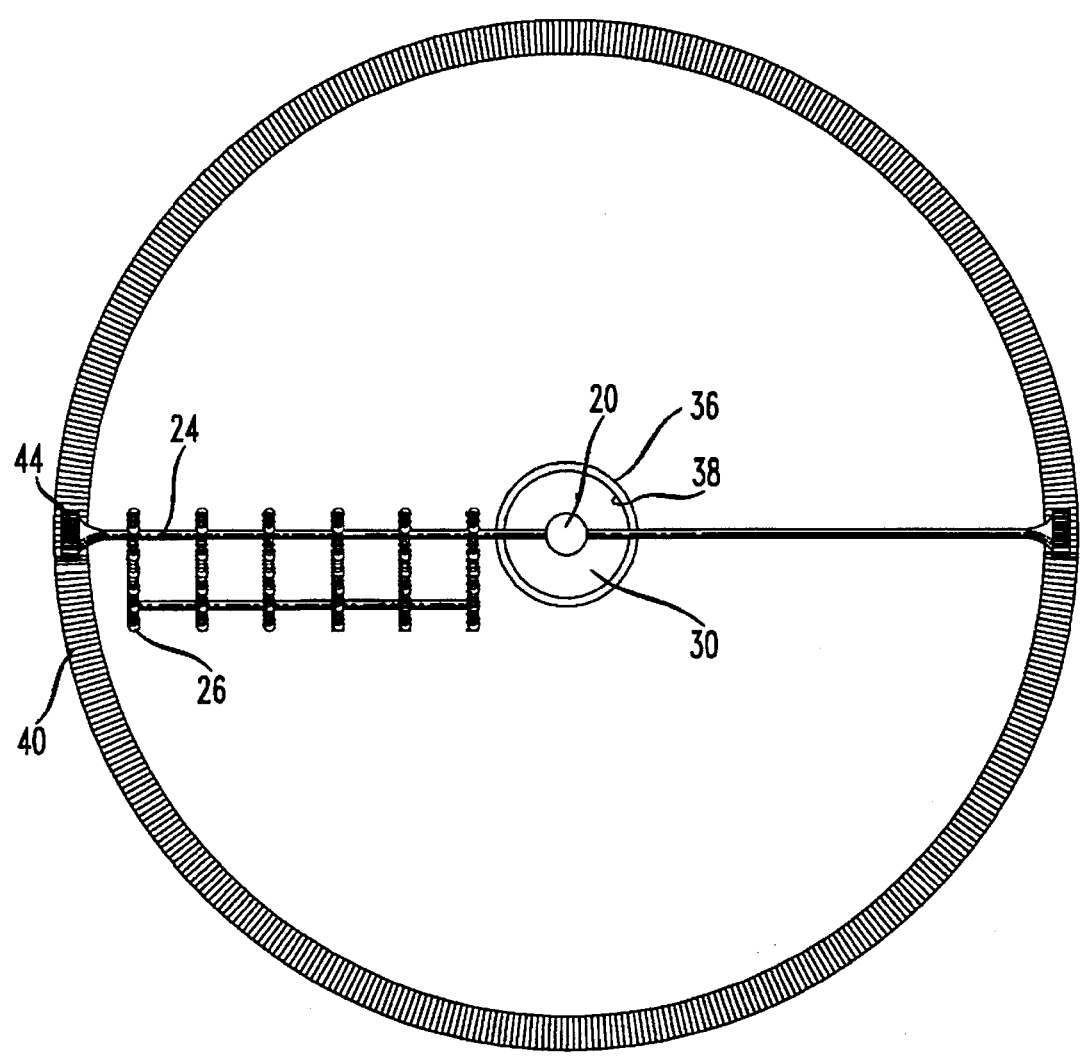
FIG. 2 is a top view of the waste digester.

FIG. 2 is a top view of digester 10 with the roof or top 18 removed. FIG. 2 aids in illustrating the suspension of support carriage 24 between support pillar 20 and upper surface 23 of support shoulder 22 which spans the interior circumference of digester 10. FIG. 2 also aids in the illustration of barrier wall 36 concentrically disposed about support pillar 20 and about the circumference of outlet means 32 and more clearly illustrates the vertical slit 38 formed by the offset edges of barrier wall 36 so as to provide a passageway for the passage of treated organic waste material to outlet means 32. FIG. 2 does not illustrate the means for depositing organic waste material into the housing.

In operation, the untreated organic waste is deposited within digester 10 proximate to the outer circumferential wall. Support carriage 24 rotates about the interior of digester 10 with agitation means 26 bringing the organic waste material at the lower portion of digester 10 to the upper surface as it rotates about support pillar 20. This agitation, together with the controlled temperature within digester 10 enhances the cultivation of bacteria which transforms the untreated organic waste material to organic waste material such that by the time the untreated organic waste material deposited proximate the outer circumference has been transported by the agitation means 26 to the area proximate to the barrier wall 36, it has been completely treated such that it is conditioned for use as a soil enhancer to replace humus in depleted soil or as an organic fertilizer. It is at that point that it is urged by the agitation means through vertical slit 38 in barrier wall 26 to outlet means 32 and thence, to its final destination.

The amount of agitation and the residence time would be a function of the type of untreated organic waste material being introduced into the digester and several of these parameters, together with sizing, will be discussed hereafter.

The agitation means 26 suspended from support carriage 24 consists of a plurality of continuous chain drives or belts, each having a plurality of extending cup-like teeth which, through their rotation, continuously bring organic waste material from the lower portion of digester 10 to the upper surface and in turn move organic waste material from the upper and middle surface towards the lower portion of digester 10. FIGS. 3 and 4 provide a side and front view of agitation means 26. FIGS. 5 and 6 are partial closeup side and top views of the chain drive.

Referring to FIG. 3, there is illustrated a side view of one of the elements of agitation means 26 which comprises of continuous chain drive 46 positioned between an upward positioned drive sprocket 48 and a lower positioned idler sprocket 50. Positioned on each chain 46 would be a plurality of cup-like teeth 52. Cup-like teeth 52 are formed and positioned on chain 46 so as to draw organic waste material 30 from the lower portion of housing 12 upwardly and over the top of drive sprocket 48 and deposit this organic waste material on the upper surface of the bed of organic waste material within housing 12. Each agitation means would perform this process on a continuous basis. The cup-like teeth 52 would be formed of a high tensile steel and be shaped so as to be self-cleaning upon rotation over the top of drive sprocket 48 and would also be formed with a cutting surface in the event that the organic waste material 30 contained certain other debris.

Preferably, chain 46 would in fact be a continuous chain having cup-like teeth 52 secured thereon much in the manner of a chain saw, only having a greater width. Further, as illustrated in FIG. 4, in order to secure the positioning of idler sprocket 50 and chain 46, a support 54 could be mounted on the respective axle 51 of idler sprocket 50 and extend toward drive sprocket 48, but terminating short thereof where it would be secured to a cross-member 49 which would extend from pillar 20 through all of such supports 54 on each of the agitation means. Axle 47 on drive sprocket 48 would also be the drive axle for drive sprocket 48 for the rotation of chain 46. This drive axle 47 could in fact be the actual support carriage bar 24 or could be an auxiliary bar depending down from support carriage bar 24. Additionally, a cleaning element 53 as illustrated in FIG. 4 to engage teeth 50 to ensure the removal of accumulated organic waste which was not removed by the centrifugal force of teeth 52 rotating about drive sprocket 48.

Figure 7:
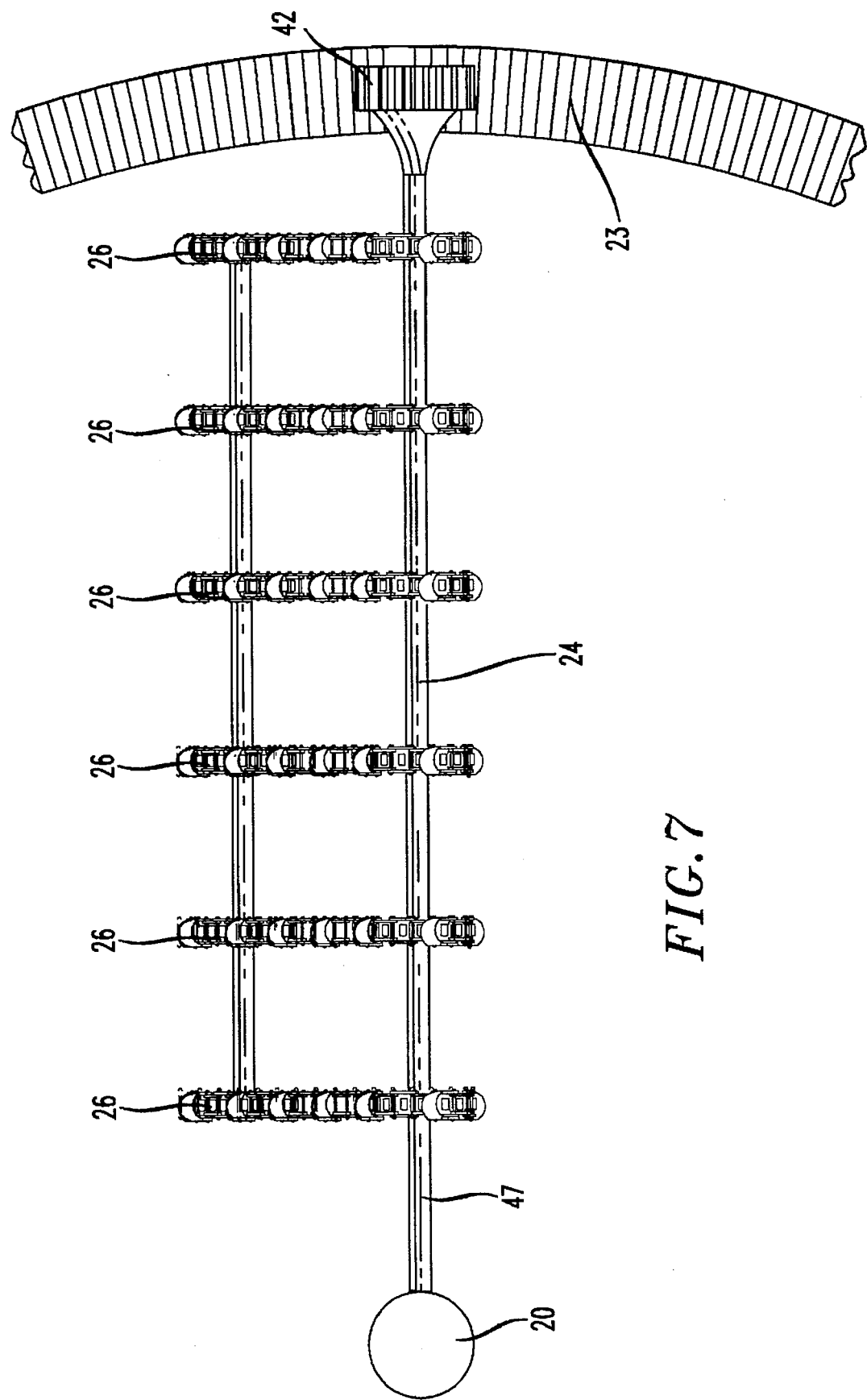
FIG. 7 is a top view of the support carriage agitation means.

The spacing of the agitation means 26 would be dependent upon the size of housing 12, the volume of the organic waste bed within housing 12, and the desired residence time of the organic waste material within housing 12. The preferable design would have the drive sprockets 48 mounted on the actual support bar of the support carriage 24 or an auxiliary support axle. The idler sprocket 50 would be positioned forward of the drive sprocket 48 as illustrated in FIG. 7. In this regard, as the agitation means was rotated within housing 12, the cup-like teeth 52 on chain 46 would be engaging organic waste material at the lower portion of the housing and transporting it upwardly, over the drive sprocket 48 and depositing it on the upper surface of the organic waste material within the housing 12. In this manner and design, the agitation means aids in the rotation of the support carriage since it eats into the organic waste material in front of it and removing it upwardly in the fashion illustrated in FIGS. 3 and 4.

FIG. 5 is a partial side view of the drive chain and FIG. 6 is a partial top view of the drive chain 46. As illustrated, the drive chain is comprised of a series of links 56 which would form a continuous loop. Secured to selective links at spaced apart intervals would be cup-like teeth 52. These teeth could be secured separately to chain drive 46 or could be secured utilizing the attachment means 58 which secures the links 56 themselves.

The number of agitation means in the form of chains 46 will depend upon the diameter of the housing 12 and the amount of residence time desired. It should also be pointed out that if the agitation means 26 are mounted on an auxiliary drive axle as opposed to the support rod of the support carriage, their angularity with respect to the radius of the housing can also be adjusted in order to increase or decrease the speed within which organic waste material is moved from the outer circumference towards the inner circumference and the outlet means 32.

Positioned within housing 10, at various selected positions below the level of the organic waste material, would be a plurality of thermocouples 60 to monitor the temperature of the organic waste material bed. This would provide the operator with information regarding the decomposition of the organic waste material so as to permit the adjustment as required, of the rotation of the support carriage and the speed of rotation of the agitation means.

Figure 8:
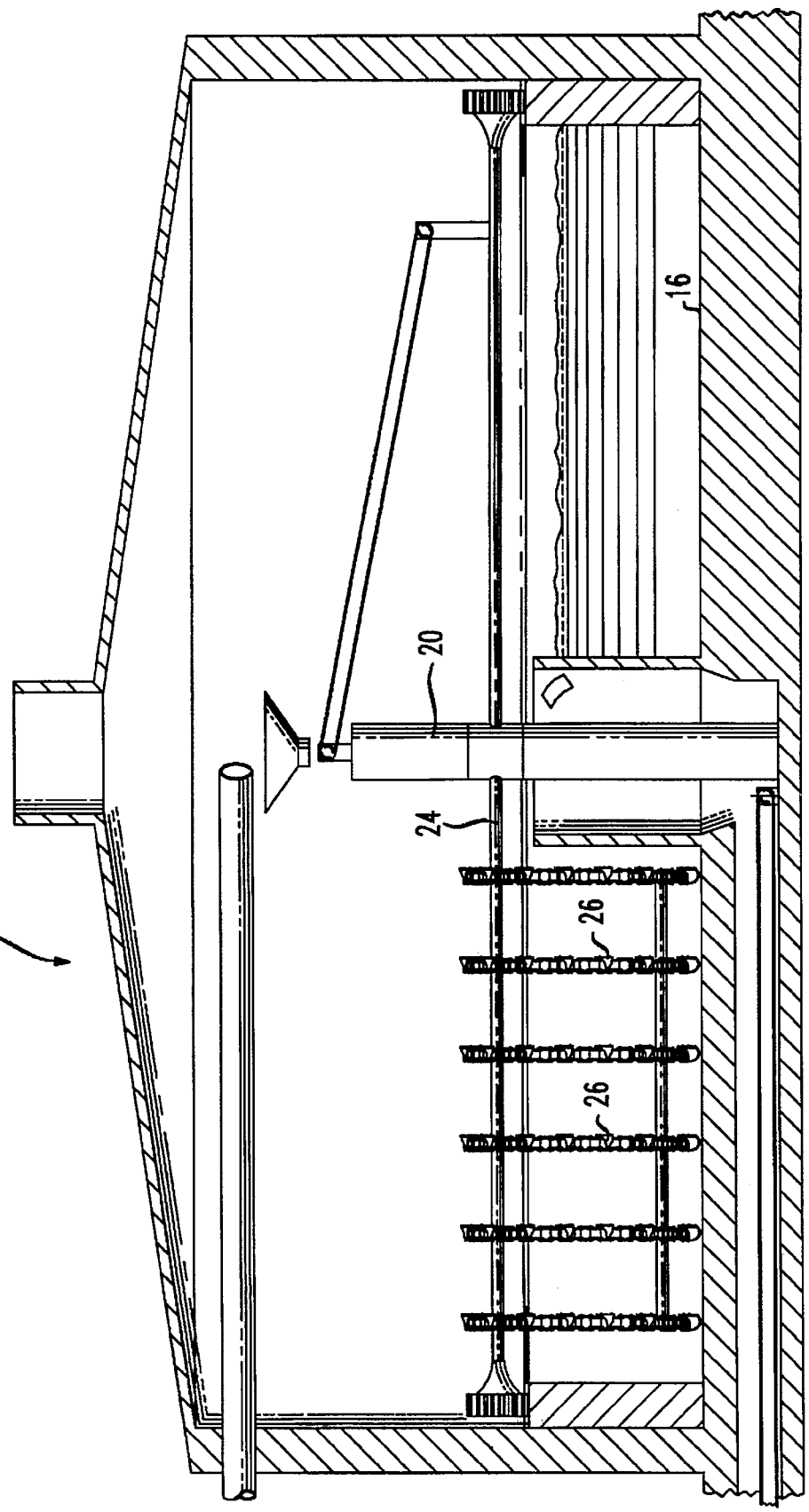
FIG. 8 is a cross-sectional side view of an alternative embodiment of the digester

FIG. 8 is a side view of an alternative embodiment of the waste digester 10, the only difference being that instead of one support carriage, there would be a second support carriage 62 disposed 180° from the support carriage carrying the agitation means. The second support carriage would be utilized to deposit the incoming organic waste material proximate to the outer circumference of the housing. This embodiment allows for balance between the two support carriages about pillar 20.

In either the first or second embodiment, as illustrated in FIGS. 1 or 8, Applicant would intend to take a portion of the treated waste in the form of fertilizer or soil enhancer from the outlet means 32 and recycle it to inlet means 28 to mix with incoming organic waste in order to inoculate the incoming waste with the bacteria developed during the outgoing waste's previous residence time in digester 10. The range of 3 to 5% of the outgoing stream of fertilizer or soil enhancer should be sufficient to inoculate the incoming waste stream.

Waste digester or composter 10 can be of a diameter of choice, depending upon the throughput volume desired. Optimally, the bed of organic waste within digester 10 should be approximately 4 feet. The temperature of the waste bed should be maintained at approximately 100° F. with a preferred moisture content of the incoming stream between 40 and 60%. Digester 10 can be computerized such that readings from the thermocouples 60 positioned within the housing and below the level of the bed would give a continuous readout of temperature conditions. The speed of the support carriage 24 and more importantly, the speed of agitation means 26 can then be automatically adjusted to maintain optimum operating conditions. For instance, the more agitation of the bed by agitation means 26 means that material of a higher temperature will be raised to the surface and air will be introduced into the lower portion of the bed thus cooling the temperature of the bed. The speed of rotation of support carriage 24 will affect the residence time that organic waste material introduced to the outer circumference of housing 10 remains within housing 10 subject to the agitation means before exiting the housing as fertilizer or soil enhancer.

While the present invention has been described with reference to its preferred embodiment, it will be appreciated by those of ordinary skill in the art that various changes can be made to the apparatus without departing from the basic spirit and scope of the invention.

What is claimed is:

1. A digester for the treatment and conversion of organic waste material to fertilizer or a soil enhancer to replace humus and depleted soil, the digester comprising:

a housing for the maintenance of a bed of organic waste material, said housing a having generally circular sidewall;

an inlet means for the introduction of organic waste material into said housing;

an outlet means for the discharge of converted organic waste material from said housing;

a support means positioned within said housing, said support means comprising a centrally disposed vertically oriented pillar positioned at the center of said housing, and an inwardly depending circumferential shoulder member about the inner portion of said circumference of said housing, there being disposed therebetween, a support carriage rotatable about the interior of said housing;

an agitation means secured to and depending from said support carriage, said agitation means comprising a plurality of chain drives mounted on an upper drive sprocket secured to said support carriage and a lower idler sprocket, said chain drive having positioned thereon, a plurality of cup-like teeth, said chain drives positioned in an angular relationship to said support means such that said idler sprockets of said chain drives are positioned forward and in the direction of advancement of said chain drives from said drive sprockets;

a power means for rotating said support carriage about the interior of said housing and for the rotation of said plurality of chain drives;

a temperature sensing means.

2. The digester in accordance with claim 1 wherein said inlet means is cooperable with a hopper and transport means secured to said pillar and said support carriage for directing said incoming organic waste material to a deposit point proximate to the outer periphery of said housing.

3. The digester in accordance with claim 2 wherein said organic waste material is deposited proximate to said outer circumference of said housing by means of said hopper, centrally positioned above said pillar and under said inlet means, said hopper cooperable with a transport means transporting said organic waste material to said outer circumference, said transport means supported by said pillar and said support carriage, said transport means comprising a continuous web belt.

4. The digester in accordance with claim 1 wherein said inwardly depending support shoulder about said inner circumference of said housing contains an upper, notched, gear surface cooperable with the rotatable gear head of said support carriage for positive rotation of said support carriage about said inner circumference of said housing.

5. The digester in accordance with claim 1 wherein said outlet means comprises a vertical concentric wall about said pillar of a height sufficient to extend above said bed of organic waste material in said housing, said concentric wall having a slit, vertically oriented and opposing the direction of rotation of said support carriage for the discharge of converted organic waste material to said outlet means.

6. The digester in accordance with claim 1 wherein said agitation means has a cleaning means for cleaning said cup-like teeth, said cleaning means positioned proximate to said upper drive sprocket.

7. The digester in accordance with claim 1 wherein a second support carriage is positioned between said pillar and said circumferential shoulder member, said second support carriage being positioned opposite said first support carriage, said second support carriage cooperable with a hopper and transport means secured to said pillar in said second support carriage for directing said incoming organic waste material to a deposit point proximate to the outer periphery of said housing.

8. A digester in accordance with claim 1 wherein said organic waste material is deposited proximate to said outer circumference of said housing by means of said hopper, centrally positioned above said pillar and said inlet means, said hopper cooperable with a transport means transporting said organic waste material to said outer circumference, said transport means supported by said pillar and said second support carriage.

9. The digester in accordance with claim 1 wherein said temperature sensing means comprises a plurality of thermocouples selectively placed in said housing beneath said bed of organic waste material to monitor temperature.

10. The digester in accordance with claim 1 wherein said agitation means are angularly adjustable about their vertical axis.

11. The digester in accordance with claim 1 wherein said outlet means for discharge of said converted organic waste material comprises a transport means positioned beneath said vertical concentric wall extending outwardly beyond said housing said transport means comprising an auger or continuous belt.

12. The digester in accordance with claim 1 wherein a portion of said converted organic waste material from said housing is recycled to said inlet means for enhancement of the decomposition of said incoming organic waste material.

* * * * *